United States Patent [19]

Baylis et al.

[11] 3,996,563
[45] Dec. 7, 1976

[54] DATA PROCESSING APPARATUS

[76] Inventors: Peter Erskine Baylis; Ralph John Howell Brush, both of The University, Dundee, Scotland, DD1 4HN

[22] Filed: Jan. 25, 1974

[21] Appl. No.: 436,643

[30] Foreign Application Priority Data

Feb. 2, 1973 United Kingdom ............ 5302/73

[52] U.S. Cl. .................. 340/172.5; 178/DIG. 20
[51] Int. Cl.² ......................................... G06F 1/00
[58] Field of Search ............. 340/172.5, 347 AD; 178/DIG. 3, DIG. 20, 6.8; 179/15.55 R, 15.55 T

[56] References Cited

UNITED STATES PATENTS

| | | | |
|---|---|---|---|
| 3,299,204 | 1/1967 | Cherry et al. ............ | 179/15.55 R |
| 3,383,461 | 5/1968 | Malling ..................... | 178/DIG. 3 |
| 3,402,258 | 9/1968 | Lerner ...................... | 179/15.55 |
| 3,676,862 | 7/1972 | Sasabe ...................... | 178/DIG. 3 |
| 3,752,912 | 8/1973 | Ohsawa ..................... | 179/15.55 T |
| 3,789,137 | 1/1974 | Newell ...................... | 178/6.8 X |
| 3,816,664 | 6/1974 | Koch ......................... | 179/15.55 R |

OTHER PUBLICATIONS

Collins, "Electronics," Jan. 22, 1968, pp. 86–94.
Anuta, "IBM Technical Disclosure Bulletin," vol. 7, No. 6, Nov. 1964, pp. 488–489.

*Primary Examiner*—Charles D. Miller
*Attorney, Agent, or Firm*—Miller & Prestia

[57] ABSTRACT

Data processing apparatus redistributes data obtained from a data signal in which data is non-linearly distributed with respect to time, the redistribution being such as to provide the obtained data in linearly distributed form with respect to time. Means may be arranged to supply the linearly distributed data from the apparatus in a form which can be used to control a facsimile recorder having predetermined speed and reaction-time characteristics. The data may be obtained from the data signal by sampling means controlled by controlling means which includes a shaping circuit producing an analogue control signal or discrete command signals.

11 Claims, 6 Drawing Figures

DATA PROCESSING APPARATUS

The present invention relates to apparatus for processing a data signal in which the data is non-linearly distributed with respect to time in a predetermined way, for example, radiometer scanning data for use in ground stations for receiving meteorological or other data produced by a mechanical scanning device on a spacecraft. It is a particular advantage to the users of such radiometer data, which is generally transformed into pictorial form that the view obtained shall be at all times on a scale as if it were taken orthogonal to the surface of the earth. This is done by linearising the data signal.

A further important requirement is that the linearisation of the data should take place "in real time" (i.e. at the time the picture is being received, rather than subsequently) so that there shall be no delay in obtaining the processed picture.

The Itos spacecraft is launched in a near circular polar orbit so that it is sun-synchronous. By suitable choice of orbital parameters, it is arranged that complete coverage of the earth is achieved twice every 24 hours. The spacecraft transmits data continuously to ground station designed to receive the signals whenever the spacecraft is above the horizon at any one station which occurs for about 20 minutes during any one orbit.

A mechanical scanning radiometer is provided in the spacecraft and is arranged to scan the area passing beneath the spacecraft along a line at right angles to the spacecraft motion from horizon to horizon of the earth. The particular scanning arrangement used is a rotating mirror which, as a result of the choice of the spacecraft's altitude, views the earth surface for about one third of its 360° rotation. During the remaining period of the mirror's scan, when no scanning information is being transmitted, telemetry and synchronising data and another channel of useful data are time-multiplexed with the scanning signal.

As the mirror scans the earth, the scale of the view of the surface of the earth varies continuously along the scan, being greatest and varying less rapidly over the few degrees directly beneath the spacecraft, and least and varying most rapidly near the horizons (i.e. the view of the areas at the horizons of the earth is somewhat compressed). Thus the signal obtained from the radiometer is non-linear.

The radiometer is usually sensitive only to one particular wavelength e.g. in the visible or infra red part of the spectrum. The signals transmitted may consist of an F.M./A.M. type, and the result of demodulating the F.M. signal is generally a subcarrier whose amplitude varies from 0 to 100% corresponding to the amplitude of the parameter being measured. This type of analogue signal may in some cases be directly fed to a facsimile recorder, or, if necessary, to an electronic processor, and then to the recorder.

A picture printer with a linear scan such as a mechanical facsimile recorder will, when supplied with the non-linear radiometer signal, present a distorted picture of the earth's surface which is only marginally useful.

It is an object of the present invention to provide means for compensating for the non-linearity, in such a way that a picture which is linear in the direction of the spacecraft scan can be produced. It is recognised that such a picture is still not a perfect picture of the earth's surface, in that all such projections of the curved earth's surface on a flat display have deficiencies, but the resultant pictures are nevertheless directly comparable with any normal map which uses orthogonal projection.

According to the present invention there is provided apparatus for processing a data signal in which data is non-linearly distributed with respect to time in predetermined war, said apparatus including redistribution means for receiving the data signal and producing the data in digital form and means, connected to said redistribution means, for controlling the data production in accordance with a predetermined non-linear characteristic such that the produced data is distributed substantially linearly with respect to time.

Embodiments of the invention will now be described, by way of examples only with reference to the accompanying drawings in which.

Figure 1:
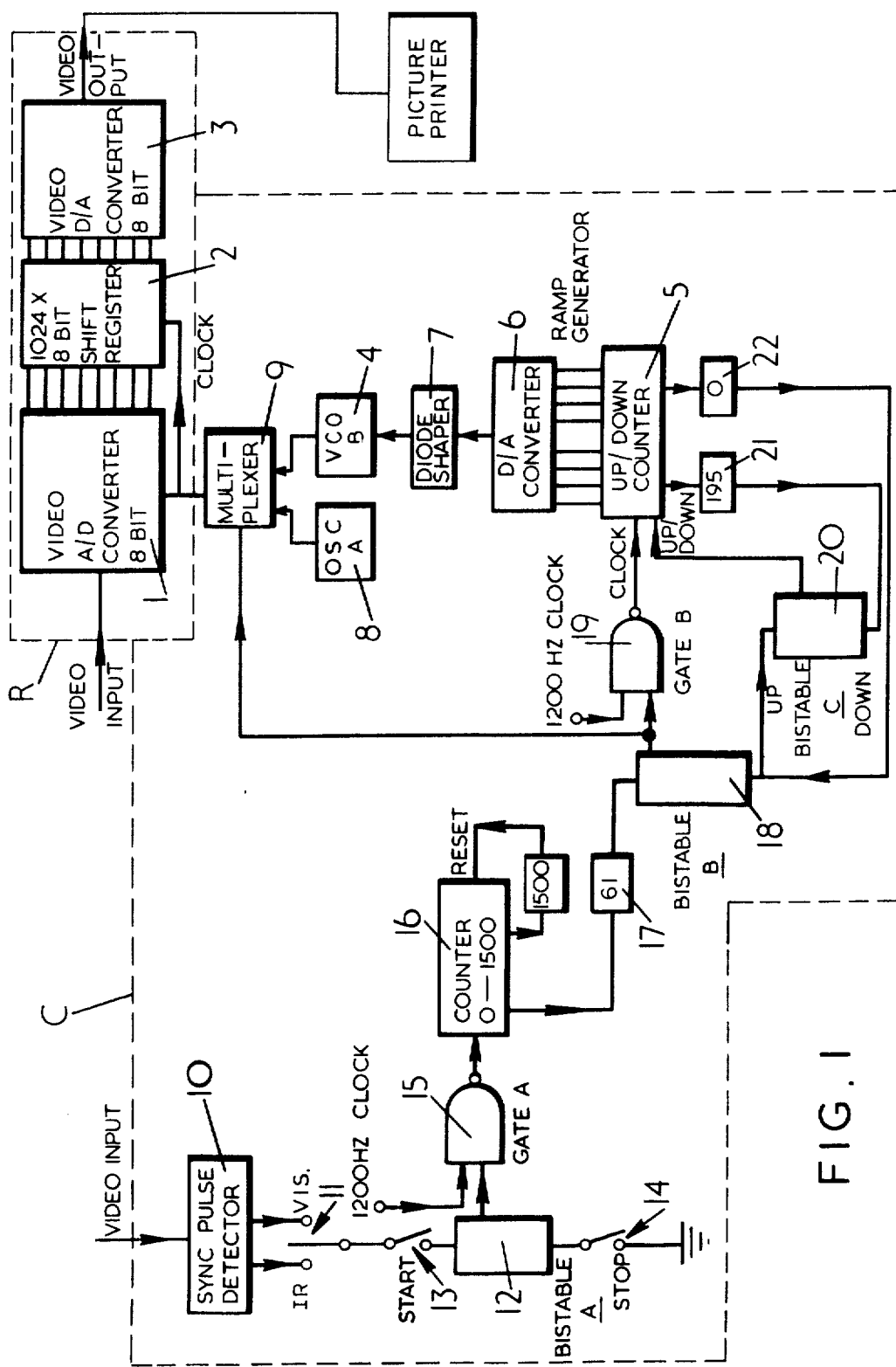
FIG. 1 is a block diagram of data processing apparatus embodying the linearising circuit.

Although the following description refers specifically to the Itos series of satellites, the invention is by no means restricted to the Itos satellite, and may be applied, for example, to other scanning radiometers. FIG. 1 relates to a system which will work with a picture printer operating at 96 lines per minute.

Figure 2:
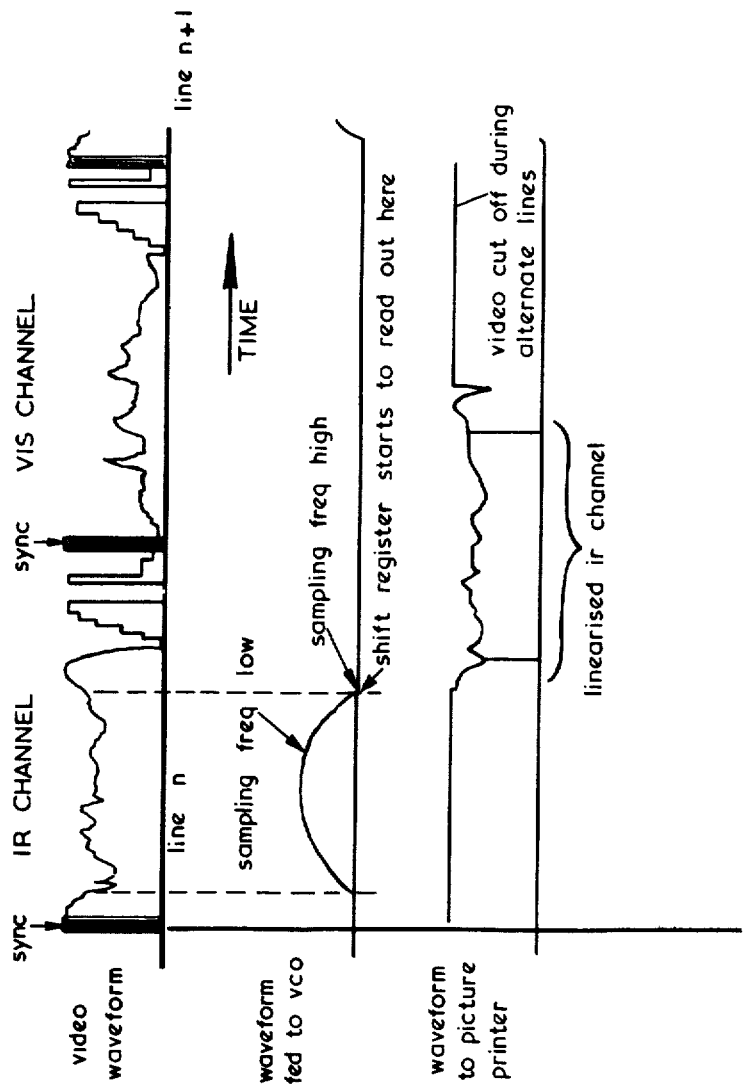
FIGS. 2a to 2c are graphs illustrating the operation of the appratus shown in FIG. 1.

Referring to FIGS. 1 and 2, an analogue signal, comprising a video input signal is received in bursts of substantially constant frequency and length (FIG. 2a-IR channel) by data processing apparatus as shown in FIG 1. The data processing apparatus includes a data redistribution circuit R including data sampling means in the form of an analogue-to-digital converter 1, a shift register 2 and a digital-to-analogue converter 3.

Controlling the operation of the arrangement of converter 1, shift register 2 and converter 3 is controlling means C including a voltage controlled oscillator 4 whose control voltage characteristic (FIG. 2b) is produced by a shaping circuit comprising an up/down counter 5, a digital-to-analogue converter 6 and a diode shaping circuit 7. The output from the oscillator 4 is multiplexed with the output from an adjustable constant frequency oscillator 8 by means of a multiplexer 9. The output from the multiplexer 9 is connected to both the converter 1 and the shift register 2.

Control of the multiplexer 9 and of the shaping circuit is achieved by using detecting means and timing means having the respective functions of detecting a well-defined reference pulse in the video signal to provide synchronisation, and timing the operation of the apparatus from the detection of the reference pulse.

The detecting means comprises a reference pulse detector 10 having the capacity for detecting the reference pulse for either of the two time-multiplexed channels, IR and VIS, in the satellite depending on the position of switch 11. Thus the channel to be "linearised" can be selected by means of the switch 11.

A bistable 12 having an ON switch 13 and an OFF switch 14 is arranged to receive the output from the detector 10 and serves to open a gate 15 whenever the detector 10 indicates reception of a first reference pulse after closing of the switch 13. The opening of the gate 15 serves to pass a 1200 Hz clock pulse signal to a cycling counter 16 of the timing means. The counter 16 then counts from 0 to 1500 and then resets to 0 and starts counting again. This cycling of the counter 16 continues until the state of the bistable 12 is changed by means of the switch 14 to close the gate 15. Since, in this case, the satellite is moving at right angles to the scan, it is convenient to phase lock the 1200 Hz clock pulse signal to the sub-carrier of the satellite signal so as to compensate for the Doppler shift due to the satellite's motion.

Since, in this particular example, only a predetermined part of the satellite signal length in time is to be processed, i.e. ± 20% about the part of the signal corresponding to the scanned portion directly under the satellite, a preset count detector 17 is arranged to detect when the counter 16 reaches a count of 61. The detector 17 is arranged then to operate a bistable 18 so that the latter causes a gate 19 to open and operates the multiplexer 9 so that the voltage controlled oscillator 4 takes over control of the converter 1 and shift register 2 from the oscillator 8 which, until now, has been in control.

The opening of the gate 19 serves to supply a 1200 Hz clock pulse signal (also phase locked to the satellite subcarrier) to the up/down counter 5 which counts from 0 to 195 and back down to 0 as determined by a bistable 20, a count 195 detector 21 and a count 0 detector 22. The latter supplies a reset pulse to the bistable 18 to cause the closing of the gate 19 and the operation of the multiplexer 9 to put the oscillator 8 back in control in place of the oscillator 4, when the count of the counter 5 has returned to 0. The bistable 20 determines whether the counter 5 is in the up on down state depending on whether the bistable 20 has had its state last changed by the detector 22 or the detector 21 respectively.

The count supplied by the counter 5 to the converter 6 causes the latter to produce an up/down ramp signal which is shaped in a predetermined manner by the diode shaping circuit 7.

The shaping of the control voltage characteristic is, in this example, according to the law relating the geocentric angle of the earth with the mirror angle of scan (which is proportional to time) and this law is given by the equation $$\psi = 180° - \left( W + \arcsin \left( \frac{R+h}{R} \sin W \right) \right)$$

where
 $W$ = mirror angle of scan
 $R$ = earth radius
 $h$ = height of spacecraft
 $\psi$ = earth geocentric angle measured from a reference point on earth directly underneath the spacecraft.

This relationship can be used to identify the "true position" (i.e. the position relative to the reference point measured on a linear scale) of any place to which the radiometer attributes a particular angle of scan and a particular radiometer measurement. This enables a picture to be formed to a substantially linear scale in the direction of scan by re-locating data bits in the signal produced by the radiometer according to their true positions instead of their positions as seen by the scanning mirror.

The arrangement of converter 1, shift register 2 and converter 3 receives the video signal (see FIG. 2a — IR channel) in which data is distributed in a non-linear manner with respect to time due to the manner in which the video signal is obtained which, in this example, is due to the scanning of the curved surface of the earth. The sampling means extracts data from the incoming video signal at intervals which are determined by means of the oscillator 4 and the shaping circuit so as to compensate for the non-linear data ditribution i.e. where data is compressed such as at the portion of the satellite video signal corresponding to the scanned portion adjacent a horizon, the sampling means samples data at a higher rate than for a scanned portion directly under the satellite (see FIG. 2b) and, since the sampled data is then read out at a constant rate, the high frequency sampled portion of the video signal is effectively stretched in time (see FIG. 2c).

The sampled data is fed, in digital form, to the shift register 2, the read-in to the shift register being controlled by the oscillator 4 in phase with sampling by the converter 1. The shift register stores the sampled data until, at the end of the processing period (when the counter 5 returns to count 0), the data is read out at a constant rate from the shift register under the control of the oscillator 8. The converter 3 converts the digital read-out from the shift register into an analogue video signal which can be used to control a facsimile recorder such as a picture printer. The index of co-operation between the processing apparatus and facsimile recorder is determined by the rate of read-out which depends on the adjustment of the oscillator 8.

Figure 3:
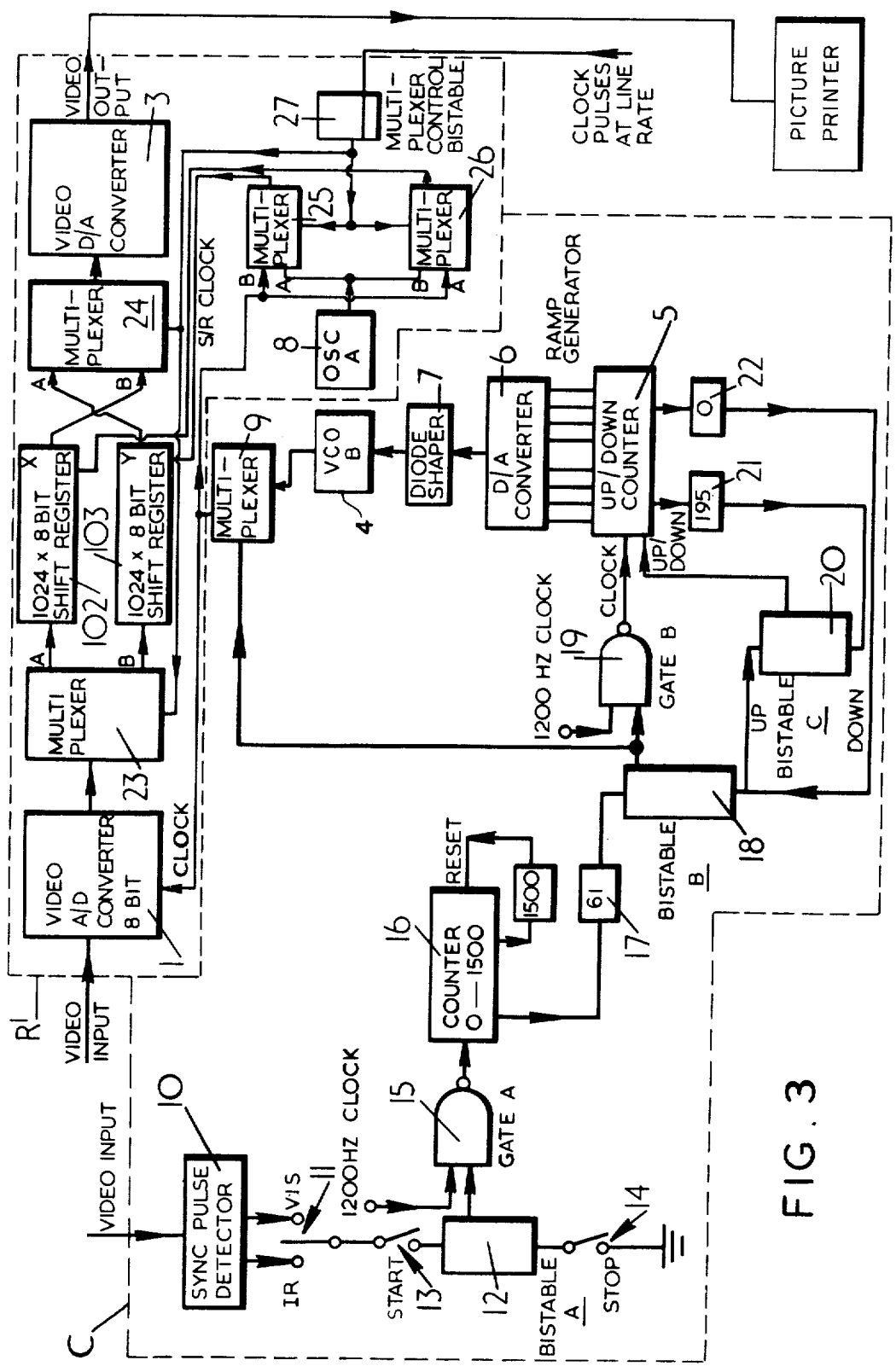
FIG. 3 is a block diagram of a second embodiment of the present invention.

To enable a picture printer operating at 48 lines per minute (i.e. the read-out of a line is only half as fast as for the apparatus shown in FIG. 1) to be connected up to the apparatus described above, a modification to the apparatus is necessary as illustrated in FIG. 3.

Referring to FIG. 3, the processing apparatus shown is identical with that shown in FIG. 1 except in that the oscillator 8 has been transferred from the controlling means C to a modified data redistribution circuit R¹.

The redistribution circuit has been modified by replacing the shift register 2 with a pair of shift registers 102, 103 arranged always to be in opposite operating modes to read in successive batches of sampled data alternately and to read out these batches alternately during the periods when they are not reading in. To control the alternation of the shift registers, a multiplexer 23 is provided between the converter 1 and the shift registers, a multiplexer 24 is connected between the shift registers and the converter 3 and multiplexers 25 and 26, operating in opposite modes, provide a multiplexed connection for the clock pulses from the oscillator 4 and from the oscillator 8, the latter now being connected to the multiplexers 25 and 26. The alternation of the multiplexers 23 to 26 is achieved by means of a bistable 27 which is switched by means of a clock pulse signal whose frequency corresponds to the number of lines of the picture per minute. Thus, in the time slot when the shift register 102 can read in, the shift register 103 can read out and in the time slot when the shift register 102 can read out the shift register 103 can read in. The read-out of a line can therefore occupy more time than with the apparatus shown in FIG. 1 where the read-out had to take place in the time slot between one data batch coming from the converter 1 and the next.

Figure 4:
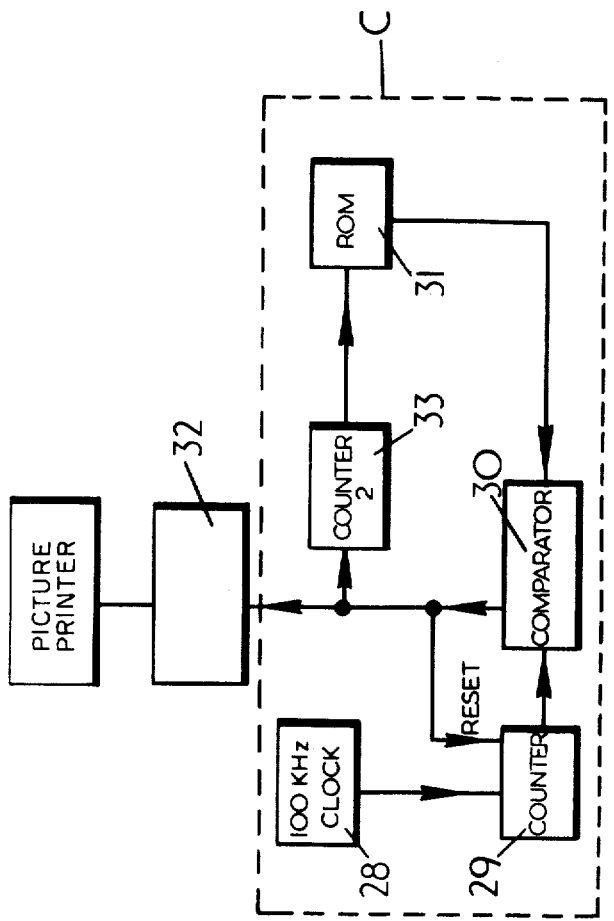
FIG. 4 is a block diagram of a third embodiment of the present invention.

Referring to FIG. 4, a further modification of the processing apparatus is shown. The apparatus shown is identical with that shown in FIG. 1 or FIG. 3 except in that the means controlling the data sampling now comprises a shaping circuit in the form of timing means and read-only memory both connected to a comparator. The read-only memory is programmed to trigger the comparator to provide a sample command sign whenever the timing means provides a predetermined indication of time to the comparator. The predetermined time indications with which the read-only memory is programmed are such as to distribute the sampled data in accordance with the appropriate law as in the case of the shaping circuit used in the apparatus shown in FIGS. 1 and 3.

In the apparatus shown in FIG. 4 the timing means comprises a constant frequency clock pulse signal generator 28 connected to a counter 29 supplying a digital time indication to a digital comparator 30. A second digital input to the comparator is provided by a read-only memory 31 programmed as described above.

The comparator output is connected to supply a sample command signal to the redistribution circuit 32 which may be the same as that shown in FIG. 1 or FIG. 3. The comparator output is also arranged to reset the counter 29 each time the comparator is triggered and to supply a count pulse to a counter 33 which shifts the read-only memory to the next digital read-out in its programme. The sample command signal supplied to the circuit 32 is such that one data bit is sampled.

The apparatus described provides an effective, economical and reliable means for processing the satellite data in real time.

A system using a digital computer to compensate for non-linearities similar to those encountered here would involve considerably more expense than in the present invention. In addition, the need to operate in real-time would further increase the expense, by requiring considerably computer time for the whole satellite pass.

We claim:
1. Apparatus for producing from a data signal representing a first picture form a picture in a second desired picture form which is different from the first picture form and has a predetermined non-linear relationship with said first picture form, said apparatus comprising redistribution means for receiving the data signal, sampling means of the redistribution means for obtaining from the data signal the data to be produced in digital form, and an output of the redistribution means for supplying the sampled data, means connected to the output of the redistribution means and arranged to produce said second picture form in accordance with data from the output of the redistribution means, means connected to the redistribution means for controlling the redistribution means and produced by the output of said latter means, a voltage controlled oscillator, a shaping circuit connected to the voltage controlled oscillator and prearranged to supply a nonlinear voltage characteristic to the voltage controlled oscillator so that the latter produces a control signal whose frequency is varied with time in accordance with said non-linear voltage characteristic, the voltage controlled oscillator being connected to said sampling means to supply said control signal to the sampling means to control the rate of sampling so as to cause the distribution of data produced at the output of the redistribution means to differ in a predetermined non-linear way from the distribution of the data in the data signal received by the redistribution means, to produce said predetermined non-linear relationship between said first picture form represented by said data signal and said second picture form represented by said data from the output of the redistribution means.

2. Apparatus according to claim 1 wherein a shift register is provided and arranged to receive the data in digital form and to store the data in the order in which it is received by the redistribution means.

3. Apparatus according to claim 2 wherein a second such shift register is provided and alternating means are operatively associated with the two shift registers so that the latter operate in opposite modes and receive alternate batches of data.

4. Apparatus according to claim 3 wherein said alternating means includes a time-multiplexer connected between the sampling means and the shift registers and a second time-multiplexer arranged to time-multiplex the output signals of the shift registers.

5. Apparatus according to claim 4 wherein said alternating means further includes two synchronised time-multiplexers arranged to operate in opposite modes so as to supply a read-in control signal alternately to one and then the other of the shift registers while supplying a read-out control signal alternately to the other and then the one of the shift registers respectively.

6. Apparatus according to claim 1 wherein the sampling means comprises an analogue-to-digital converter.

7. Apparatus according to claim 6 wherein the redistribution means further includes a digital-to-analogue converter for forming an analogue signal based on the sampled data in digital form.

8. Apparatus according to claim 1 wherein the shaping circuit includes an up/down counter connected to a digital-to-analogue converter which is, in turn connected to a diode shaping circuit.

9. Apparatus according to claim 1 wherein the shaping circuit comprises timing means, a comparator and a read-only memory, the timing means being connected to supply a time indication signal to the comparator and the read-only memory also being connected to the comparator and programmed according to a non-linear pattern to trigger the comparator at predetermined time indications as supplied by the timing means to the comparator, the latter being connected to the sampling means so that, when triggered, it activates the sampling means to sample one data bit.

10. Apparatus according to claim 1 wherein detecting means is provided for receiving the data signal and detecting a predetermined part of the signal to provide synchronisation for the data processing apparatus, timing means being provided for timing the operation of the processing apparatus, said detecting means being connected to supply a synchronisation pulse to the timing means.

11. Apparatus according to claim 10 wherein activating means is connected to the timing means and is arranged to start and stop the operation of the controlling means so that the data signal is processed only over a predetermined part of its length in time, the controlling means further including an adjustable constant frequency oscillator and a time-multiplexer, the voltage controlled oscillator and the constant frequency oscillator being connected to the multiplexer which is controlled by the activating means to connect the two oscillators alternately to the redistribution means in dependence on whether sampling is to take place or not, the adjustment of the constant frequency oscillator providing adjustments of the rate of read-out of the sampled data from the redistribution means.

* * * * *